(12) United States Patent
Cao

(10) Patent No.: US 12,153,484 B2
(45) Date of Patent: Nov. 26, 2024

(54) LIMITS MANAGEMENT FOR A PROCESSOR POWER DISTRIBUTION NETWORK

(71) Applicant: QUALCOMM Incorporated, San Diego, CA (US)

(72) Inventor: Lipeng Cao, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 17/941,535

(22) Filed: Sep. 9, 2022

(65) Prior Publication Data

US 2024/0085971 A1  Mar. 14, 2024

(51) Int. Cl.
G06F 1/3293 (2019.01)
G06F 1/3215 (2019.01)

(52) U.S. Cl.
CPC .......... *G06F 1/3293* (2013.01); *G06F 1/3215* (2013.01)

(58) Field of Classification Search
CPC .............................. G06F 1/3293; G06F 1/3215
USPC .......................................................... 713/323
See application file for complete search history.

(56) References Cited

U.S. PATENT DOCUMENTS

| | | | | |
|---|---|---|---|---|
| 10,228,746 | B1* | 3/2019 | Ram | G06F 1/3206 |
| 11,243,598 | B2* | 2/2022 | Iwamoto | G09G 5/363 |
| 11,924,290 | B2* | 3/2024 | Teshome | H04L 67/306 |
| 2003/0109967 | A1* | 6/2003 | Cooper | G06F 1/3296 |
| | | | | 710/267 |
| 2004/0158771 | A1* | 8/2004 | Garnett | G06F 11/2015 |
| | | | | 714/E11.017 |
| 2007/0103136 | A1* | 5/2007 | Jain | G06F 1/26 |
| | | | | 323/282 |
| 2008/0111534 | A1* | 5/2008 | Ravichandran | G06F 1/32 |
| | | | | 323/349 |
| 2009/0150695 | A1* | 6/2009 | Song | G06F 1/00 |
| | | | | 713/323 |
| 2011/0161690 | A1* | 6/2011 | Lin | G06F 1/26 |
| | | | | 713/300 |
| 2012/0066536 | A1* | 3/2012 | Gozun | H02J 1/14 |
| | | | | 713/340 |
| 2013/0097609 | A1* | 4/2013 | Li | G06F 1/329 |
| | | | | 702/58 |

(Continued)

OTHER PUBLICATIONS

International Search Report and Written Opinion—PCT/US2023/070711—ISA/EPO—Nov. 8, 2023.

(Continued)

*Primary Examiner* — Paul R. Myers
(74) *Attorney, Agent, or Firm* — Loza & Loza, LLP/Qualcomm

(57) ABSTRACT

Aspects relate to limits management for a processor power distribution network. In an aspect, an electronic device has a processor with a processing core that is coupled to a power rail. The power rail is external to the processor. A current sensor is associated with the output of the power rail and configured to produce current sensor readings. A state-space unit is coupled to the current sensor. The state-space unit has a predictive model to apply the current sensor readings to the predictive model to predict a current budget for the processing core. A limit manager is configured to generate a current limit in response to the current budget. The limit manager limits a current draw of the processing core in response to the current limit.

28 Claims, 7 Drawing Sheets

(56) References Cited

U.S. PATENT DOCUMENTS

| | | | |
|---|---|---|---|
| 2014/0344595 A1* | 11/2014 | Jenne | G06F 13/4282 |
| | | | 713/320 |
| 2016/0070327 A1 | 3/2016 | Nemani et al. | |
| 2018/0188800 A1* | 7/2018 | Alon | G06F 1/206 |
| 2018/0284877 A1* | 10/2018 | Klein | G06F 1/3287 |
| 2019/0086982 A1* | 3/2019 | Priyadarshi | G06F 1/3206 |
| 2019/0146569 A1* | 5/2019 | Nge | G06F 1/305 |
| | | | 713/320 |
| 2019/0272017 A1* | 9/2019 | Ghose | G06K 19/0723 |
| 2020/0249737 A1* | 8/2020 | Nigam | G08B 7/06 |
| 2021/0149476 A1 | 5/2021 | Alton et al. | |
| 2021/0173419 A1* | 6/2021 | Severson | G06F 1/3206 |
| 2021/0191648 A1* | 6/2021 | Karuppiah | G06F 3/0659 |
| 2022/0010935 A1* | 1/2022 | Knott | G05D 16/208 |
| 2022/0172767 A1* | 6/2022 | Yu | G11C 11/4074 |
| 2022/0253120 A1* | 8/2022 | Rapaka | G06F 1/324 |
| 2022/0337081 A1* | 10/2022 | Davies | H02J 3/14 |

OTHER PUBLICATIONS

Bemporad A., "A Multiparametric Quadratic Programming Algorithm With Polyhedral Computations Based on Nonnegative Least Squares", IEEE Transactions on Automatic Control, vol. 60, No. 11, Nov. 2015, pp. 2892-2903.

Bemporad A., et al., "The Explicit Linear Quadratic Regulator for Constrained Systems", Automatica, vol. 38, Jan. 2002, pp. 3-20.

* cited by examiner

LIMITS MANAGEMENT FOR A PROCESSOR POWER DISTRIBUTION NETWORK

TECHNICAL FIELD

Aspects of the present disclosure relate generally to power distribution networks for powering processors and, in particular, to managing limits, for example, current limits to processing cores.

BACKGROUND

A processor receives power from a power distribution network that is coupled to a power source and delivers a regulated voltage on power rails that are coupled to the processor. The power rails may be energized by a voltage regulator or a power management integrated circuit (PMIC) that includes a voltage regulator. The PMIC may be coupled to one or more processing cores or other components of the processor. In other implementations, each PMIC is coupled to a single processing core so that the processing cores may operate independently. This configuration is present with stand-alone processors and with processors that are part of a system on a chip (SoC).

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example an electronic device has limits management for a processor power distribution network. The device has a processor with a processing core that is coupled to a power rail. The power rail is external to the processor. A current sensor is associated with the output of the power rail and configured to produce current sensor readings. A state-space unit is coupled to the current sensor. The state-space unit has a predictive model to apply the current sensor readings to the predictive model to predict a current budget for the processing core. A limit manager is configured to generate a current limit in response to the current budget. The limit manager limits a current draw of the processing core in response to the current limit.

Another example provides a method of limits management for a power distribution network that includes reading a first current sensor associated with an output of a first power rail to produce first current sensor readings, the first power rail being coupled to a first processing core of a processor, applying the first current sensor readings to a predictive model to predict a first current budget for the first processing core, generating a first current limit in response to the first current budget, and limiting a current draw of the first processing core in response to the first current limit.

Another example provides a non-transitory computer-readable medium having instructions stored therein for causing a processor to perform operations for limits management for a power distribution network. The operations include reading a first current sensor associated with an output of a first power rail to produce first current sensor readings, the first power rail being coupled to a first processing core of a processor, applying the first current sensor readings to a predictive model to predict a first current budget for the first processing core, generating a first current limit in response to the first current budget, and limiting a current draw of the first processing core in response to the first current limit.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

Figure 1:
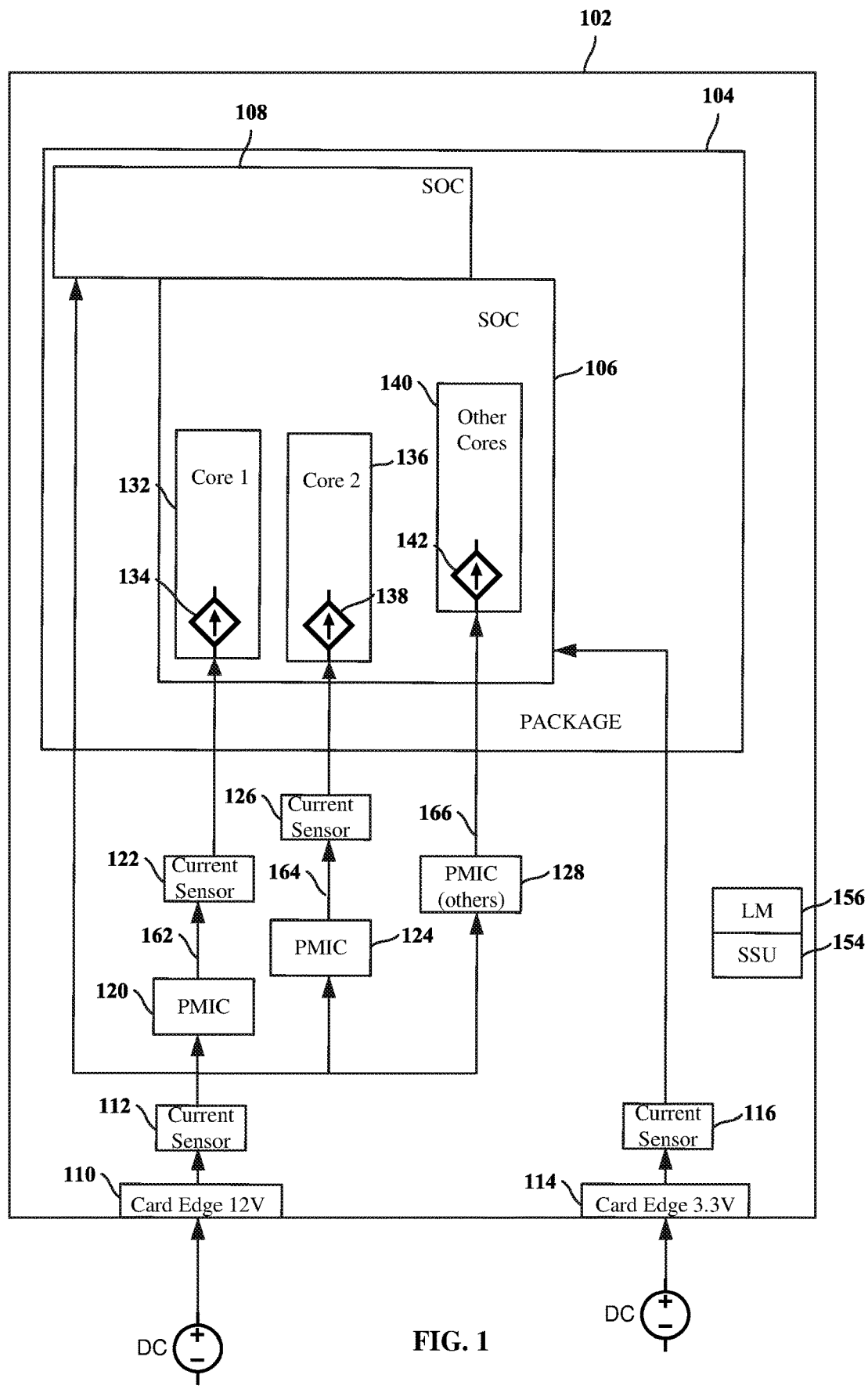
FIG. 1 illustrates a block diagram of a device with a power distribution network to power multiple processing cores in a package, in accordance with certain aspects of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Modern processors often have workloads that vary over time and are designed to reduce energy consumption when the workload permits. As a result, the power drawn by the processor changes over time and a PMIC supplies differing amounts of power over time as the processor workload changes. The PMIC includes a voltage regulator that is designed to maintain a particular voltage for the processing core. Increased power is provided by increasing the supplied current at a particular voltage. In some instances, the power demand can increase or decrease so quickly that the PMIC and other components of the power supply are not able to provide quality power through the change. In some instances, the power demand can increase or decrease so quickly that the PMIC and other components of the power distribution network are not able to provide quality voltage through the change, causing a PMIC regulator output voltage droop or overshoot. In some other instances, power demands change at a time periodicity that coincides with resonant frequencies of the power distribution network, causing current oscillation. As an example, when the latency of the power distribution network from a power supply to a processing core is large, and if a limits management system does not consider this large power distribution network latency in throttling a processing core, the power demand change that is caused by throttling a processing core could produce large current oscillations at the power supply. As a further example, for an add-on card in which power is supplied at a connector at the card edge through a power distribution network on the card to a processing core on the card, the latency from the connector at the card edge to the processing core can be large.

Limits management, also referred to as a limits management system, may be implemented in hardware or software or both and is operated by some processors to monitor the required power and then to slow the change in the power draw of a processor. The limits management system may slow down the processor clock to slow down the increased power demand. In some instances, the limits management system may add dummy instructions into a command queue to reduce the power requirements of the processor. By considering the power distribution network latency when throttling a processing core, the power demands of the processing core are changed and the oscillations in the supplied current are reduced in amplitude. This provides for improved processor performance using more stable current. It also provides more efficient use of the power by reducing the energy that is spent driving current oscillations.

A limits management system may limit the peak current and sustained current. A current that peaks above a defined limit may cause permanent damage to a circuit or affect circuit performance. For example, excessive current may cause timing errors including, for example, setup time violations in critical paths. When a current exceeds a peak current limit at a voltage regulator, the voltage may also dip below a specified regulator range. The reduced voltage may also cause hardware, software, or processing errors at the IC. A sustained current that exceeds limits may cause overheating which eventually may cause damage to the IC.

Limits management systems are designed to respond quickly to any limits violation. This allows the system to respond before processing or hardware failures occur. As an example, response times for rail current limits may be on the order of 200 to 500 nanoseconds (ns). While this may be enough to prevent damage to processing operations or physical damage to the IC, the responsive nature of the limits management system means that the current has already exceeded a limit before the system reacts. The limits must be set low enough that any harm is avoided during the time that it takes for the system to react.

In some hardware systems, there is some distance between the power supply and the IC that draws the power. The power distribution network (PDN) includes some latency in its response to any change in conditions. The latency slows the response of the power distribution network. This latency reduces the effectiveness of the limits management system to control the average current, peak current, and the slew rate of the current. The oscillations reduce the efficiency of the power distribution network in supplying power to the IC.

To overcome the latency a predictive model may be used to predict a likely future state of the power distribution network. As used herein, a state-space unit uses its predictive model for the power distribution network. By throttling a processing core based on a predicted future state, the oscillations in the power supply to a processing core are diminished. A state-space unit allows a predictive model to be used with very little hardware and computational complexity.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects or uses may come about via integrated circuit chip examples and other non-module-component based devices (for example, end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM (Original Equipment Manufacturer) devices or systems incorporating one or more aspects of the described innovations. In some practical settings, devices incorporating described aspects and features may also necessarily include additional components and features for implementation and practice of claimed and described aspects. For example, temperature and power sensors may use a number of components for analog and digital purposes (for example, hardware components including a power supply, a transducer, a detector, an accumulator, a digital to analog converter, etc.). It is intended that innovations described herein may be practiced in a wide variety of devices, chip-level components, systems, distributed arrangements, end-user devices, etc. of varying sizes, shapes, and constitution.

FIG. 1 is a diagram of an add-on card 102, for example a daughter card, an accessory card, or a peripheral component interconnect express (PCIe) card. The add-on card 102 may be formed of a variety of materials. In some examples, the add-on card 102 may include a printed circuit board (PCB) and various components. For example, one or more processing cores may be attached to the PCB. The processing cores may be attached in the form of a package 104 that contains at least one system on a chip (SOC). The SOC 106 may be coupled to other SOCs 108 within the package 104 or in another package. The SOC 106 includes a first processing core 132, a second processing core 136 and other cores 140 which may include processing cores and other types of cores. The other SOCs 108 may have the same or similar components, depending on the implementation. The processing cores 132, 136, 140 may be general purpose, video, signal processing, communications, transcoding, machine learning or any other type of processing core. Each processing core is powered by one or more current sources. The current sources are abstractions for the power consumption of the respective processing core. The current sources represent the current drawn by a processing core from a power rail at a particular voltage. Each current source 134, 138, 142 is a part of the respective processing core 132, 136, 140. The first processing core 132 has a first current source 134. The second processing core 136 has a second current source 138 and the other processing cores 140 have a current source 142. More current sources may be used to suit particular processing cores. The particular configuration of processing cores, current sources, SOCs, and packages is provided as an example. The processing cores may be packaged and connected to the add-on card in any suitable manner.

The add-on card 102 is provided with power through a high-voltage card edge connector 110 and a low voltage card edge connector 114 coupled to power distribution network. The power distribution network provides different power levels throughout each processing core. For example, the power distribution network may include voltage regulators (shown as power management integrated circuits (PMICs) 120, 124, and 128) and power rails 162, 164, 166. There may be more or fewer card edge connectors to suit different implementations. Power from the high-voltage card edge connector 110 is provided to the PMICS 120, 124, 128, which provide power to each respective current source 132, 134, and 140. For example, a first PMIC 120 provides power to a first power rail 162 that is coupled to the current source 134 of the first processing core 132, a second PMIC 124 provides power to a second power rail 164 that is coupled to the current source 138 for the second processing core 136, and a third PMIC 128 provides power to a third power rail 166 that is coupled to the current source 142 for the other processing cores 140. The power rails are indicated as a single arrow, which is representative of one or more power rails. More than one conductor is typically used to provide power in microelectronics. The PMICs 120, 124, 128 are each coupled to the high voltage card edge connector 110. The high voltage card edge connector 110 is also coupled to the other SOCs 108. This connection is shown without the details of the SOC 106 for simplicity. The low voltage card edge connector 114 is also coupled to the SOC 106. The particular components for this connection are not shown for simplicity.

The present description is presented in the context of a power source coupled to a PMIC. However, the many different functions and capabilities of some types of PMIC are not required to accomplish the limits management described herein. Aspects use the PMIC to provide a desired voltage from the card edge to the power rails. This function may also be provided by other devices, for example those that are referred to as a voltage regulator or a voltage converter. References herein to PMIC should be interpreted as including simpler and more complex devices that perform the same voltage regulation and conversion functions. Some types of PMICs monitor power rail status and report the status through, for example a power management bus (PMBus) (not shown). In some aspects, a current sensor is integrated into the PMIC. While multiple PMICs are shown, power may be supplied using other components instead. In some aspects, a discrete voltage regulator with discrete control circuitry may be used. Other types of control interfaces may be used instead of a PMBus.

Current sensors are used to measure the state of the incoming power and the state of the voltage regulators. In the example shown in FIG. 1, a first current sensor 122 is coupled to the power rail 162 at the output of the first PMIC 120, a second current sensor 124 is coupled to the second power rail 164 at the output of the second PMIC 124, and a third current sensor 112 is coupled to the output of the high voltage card edge connector 110. The high voltage card edge connector 110 serves as a common power supply that is at the input to the first PMIC 120 and to the second PMIC 124.

In addition, a fourth current sensor 116 is coupled to the output of the low voltage card edge connector 114. The current sensors 122, 124, 112, 116 may be in the form of a resistor and a voltage sensor to determine the actual current through the resistor to the power consumption device. The resistor may be coupled to the power rails 162, 164, 166 that are the output of the respective PMIC 120, 124, 128 or any other type of voltage regulator. More or fewer current sensors may be used to suit different add-on cards, different processors, and different power distribution networks. As shown the SOC 106 is in a package 104 that may include a package substrate and other substrates to carry the SOC, so that the SOC is on a substrate. The PMICs 120, 124, 128 are outside of the package 106 and may be included on a second substrate, for example a package substrate with one or more IC on it. Each PMIC may be a discrete IC on its own substrate. The current sensors 112, 122, 126 may be included on the associated PMIC substrate or a different substrate. In some aspects, the current sensors are implemented using discrete chiplets.

In a reactive limits management system, a target current is established at one or more of the current sensors 122, 126, 112, 116. The target may be for peak current, sustained current, and/or other quantities. When the target(s) are exceeded, then the affected processing core may be throttled. In the example of FIG. 1, for the first PMIC 120, when the first processing core 132 is drawing more power than is allowed by the limits, then the current at the first current sensor 122 will increase. At some time, the limits management system may throttle the processing core to reduce the current drawn by the processing core. This may be done for subdivisions of the processing core or any other part of a processor. The throttling is often done by reducing the clock speed or by inserting wait states or dummy instructions into the instruction queue, however other power reduction techniques may be used as well.

There can be a large latency in the limits management for the power distribution network (PDN) from the card edge connectors 110, 114 to the on-die power sources, for example the current sources 134, 138, 142. The card edge power may be separated from the current sources, which represent the power consumption by the respective processing core, by a few microseconds to more than ten microseconds in different hardware configurations. The latency can cause an unintended current oscillation at the card edge. The latency reduces the effectiveness of the limits management to control the average current, peak current and even the slew rate of the current at the card edge. The performance of the on-die power sources is reduced due to inefficient use of the card-edge power source. The latency is caused in part by the distances from the power source to the power sink in the processing core. It is also caused by the inherent capacitance and resistance of the electrical system. This inductance also increases the oscillation magnitude. The oscillation is greater for higher power add-on cards.

In various aspects, the add-on card 102 may further include one or more state-space units 154 coupled to each of the current sensors 122, 126, 112, 116 and one or more limit managers 156 coupled to each of the processing cores 132, 136, 140 to throttle the processing cores based on a dynamic current budget for the current drawn by the respective processing core. The state-space unit applies a state-space model to track and predict the PDN dynamics including its latency. The state-space unit (SSU) 154 optimizes a dynamic budget for the SOC power. The dynamic budget is provided to the limit manager 156 that controls the SOC power or SOC current draw, for example by throttling the related processing core. In some aspects, the limit manager 156 uses a dynamic clock frequency limit. The state-space unit optimizes the dynamic budget with model trimming, model quantization, and hardware acceleration. The state-space unit may be implemented with a very small footprint for computing the dynamic budget. By predicting a most likely future state using present current sensor measurements, the state-space unit overcomes the latency of the PDN. As a result, peak current, current slew rate, and current oscillation at the card edge are better controlled. This serves to mitigate unintended card-edge current oscillation.

The state-space unit 154 predicts the state of the power distribution network, including each PMIC 120, 124, 128 as it is affected by each respective processing core 132, 134, 140 using for example, current sensor readings produced by the current sensors 122, 124, 112, 116. The state-space unit uses a state-space model that takes input values over time, u, y, and x(t) that represent the actual physical state of the system and generates a predicted future state, x (t+1). In the state-space model, u represents an input to the model and y represents the output. The value x represents the system state that may be used to calculate the system response from the system input u to the system output y. In aspects described herein, u and y are power values based on the current sensor readings. The value x is not directly measured and is, at least in part, a function of the overall resistance, capacitance, and inductance of the PMIC and the PDN. These values are described in more detail with respect to FIG. 2. The state-space model uses a type of model predictive control (MPC) for a closed loop system in which computations are repeated over time to obtain higher accuracy in the predicted state. The model is formed using simulation data, or experimental data, or both, and may be improved for a particular device while that device is in use. The model is applied as a set of constants that are combined with a sequence of measurements over time as matrix operations in multiply accumulate units. Those results are weighted and then combined through multiple cycles of multiply and accumulate to estimate possible future states. An optimal prediction is then selected as the output state indicated herein as x.

In some instances, a state-space model is a control loop that combines tracking prediction and optimization in a discrete time closed loop system. It is described as:

$$x(t+1)=Ax(t)+Bu(t)$$

$$y(t)=Cx(t)+Du(t)$$

where A, B, C, and D are constants of the state-space model.

As used herein, the state-space unit 154 uses its predictive model for the power distribution network. This includes the PMICs 120, 124, 126, 128 and the power rails 162, 164, 166 of the PMIC outputs, as described above. The power rails have resistance, inductance and capacitance components which affect the overall system behavior. The state-space unit 154 acts through the limit manager 156 to manage the response of the PDN to changes in the current draw at the respective processing core. The predictive model of the state-space unit 154 predicts and optimizes the future state of the PDN response to changes in the current draw at the processing core 132, 136, 140. The power consumption of the respective processing core acts as a stimulus to which the PDN responds.

Figure 2:
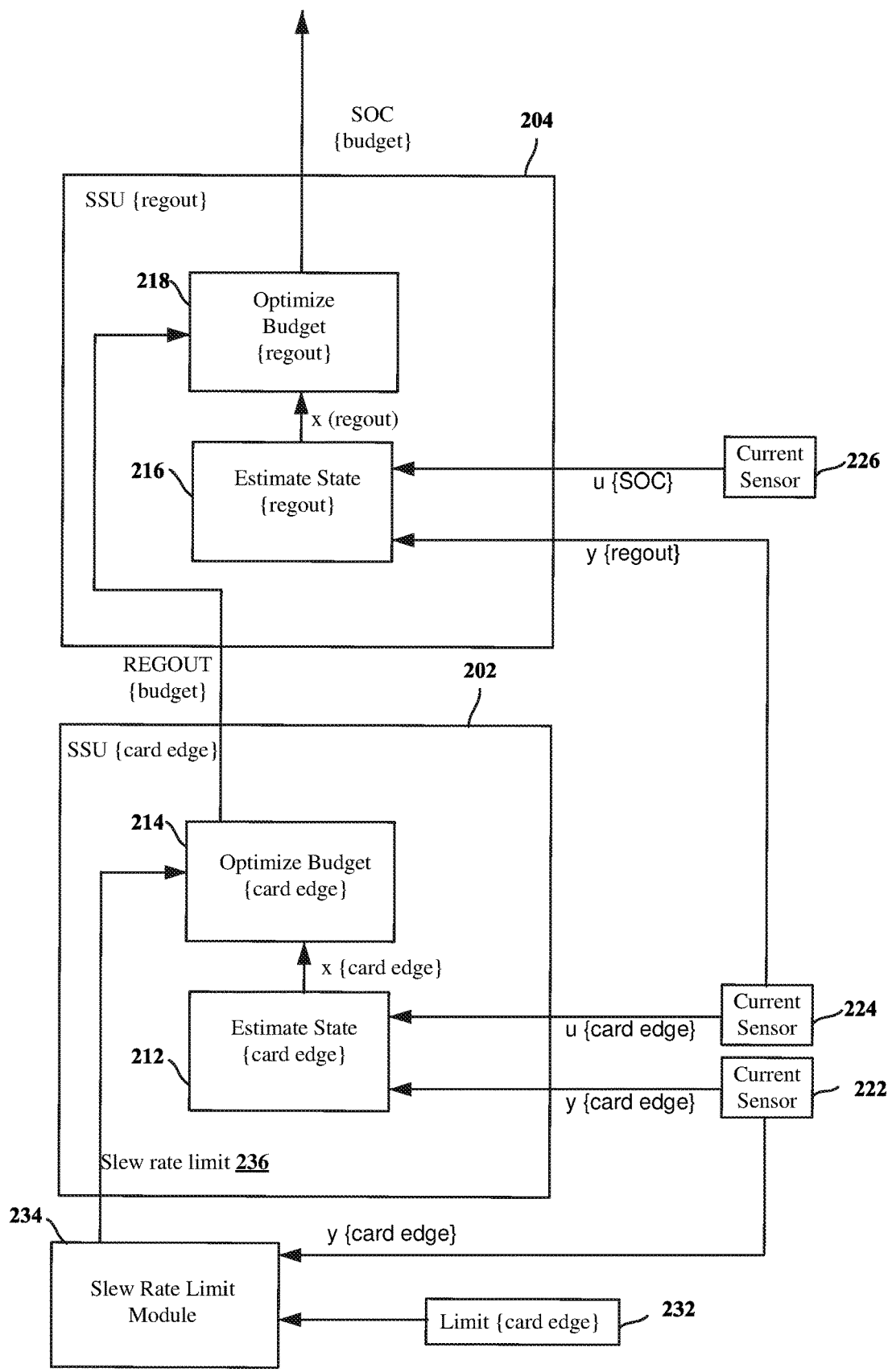
FIG. 2 illustrates a functional block diagram of a staged state-space unit, in accordance with certain aspects of the disclosure.

FIG. 2 is a functional block diagram of a staged state-space unit suitable for use as the state-space unit 154 of FIG. 1. One, two, or more state-space unit stages may be used to suit different implementations. A first stage 202 is coupled to a second stage 204. The first stage 202 is a card edge stage and receives a current value, y {card edge}, from a first current sensor 222. The first stage is adapted for use with an add-on card in which power is supplied to the system through a connector at the card edge. The power is regulated through a PDN and then supplied to a processing core. The first current sensor 222 measures the power supplied at the card edge and may be measured at the input to the first PMIC. The first stage 202 receives a second current value, u {card edge}, from a second current sensor 224. The second current sensor 224 may be the current sensor at the output of the first PMIC. These are processed through a state-space model in an estimator 212 to estimate the state at the card edge as x {card edge}. The estimate is provided to a budget optimizer 214 that generates a budget, REGOUT {budget}, for the card edge state. This is a regulator output budget to be applied to the corresponding voltage regulator, for example a PMIC of FIG. 1. The budget indicates the estimated maximum current that can be drawn at the output of a voltage regulator in order to meet the current limit requirement at the card edge. In addition, the first stage 202 takes into account the voltage differences between the card edge and the output of the voltage regulator when producing the budget. The values x, y, and u are collected over time and used in the state-space model. x corresponds to the system state at each stage that is used to determine the output y from the input u and represents a vector. u and y represent scalars in a single input-single output system such as a single PMIC providing power to a single processing core. The state-space unit may also simultaneously solve for multiple PMICs providing power each to a different processing core using the same or related PDNs in which case the result provides power limits management to different processing cores in different ways. In such a scenario, u represents a vector for the multiple processing cores and y represents a scalar for the shared common power supply in a multiple input-single output system, for example a chiplets scenario.

The voltage regulator budget, REGOUT {budget}, is provided to a budget optimizer 218 of the second stage 204 and combined with a state estimate, x {regout}, from a state estimator 216 of the second stage 204 to generate a current budget for the connected processing core, SOC {budget}. The state estimator 216 of the second state 204 receives a current value, y {regout}, from the second current sensor 224 and a current value, u {SOC}, from a third current sensor 226. The third current sensor may be in the SOC, for example a digital power meter or other current or power sensor that measures the power consumption of a particular processing core. As shown, the same current sensor readings from the second current sensor 224 are given a different variable name, u or y, in different stages of the state-space model to accord with their use at that stage.

The first stage 202 may also be coupled to a slew rate limit module 234. The slew rate of the input current from the card edge provides an indication of how much the power draw is changing for the whole system. The slew rate is also closely related to any oscillation of the power distribution network. Current sensor readings over time may be used to estimate the rate of change of the current over time, which is the slew rate. As with the other measurements, by the time a large slew rate exceeding a limit is observed, any reactive action taken to throttle the processing core is too late to prevent the slew rate from exceeding the limit. This may be because the observed large slew rate is caused by the accumulated effects from the power consumption of a processing core over the past many micro-seconds through the power distribution network latency. The effect from any action taken to throttle a processing core to reduce its power becomes observable at the card edge many micro-seconds later due to the power distribution network latency. The state-space unit is able to use a state-space model to predict when the slew rate will be large, predict a future state and take a corrective action to prevent the high slew rate from occurring.

The current value, y {card edge}, from the first current sensor 222 is provided to the slew rate limit module 234. The first current sensor 222 may be the sensor at the card edge which is the input to the first PMIC. A card edge current limit 232, Limit {card edge}, also be applied to the slew rate limit module 234. This may be a constant value that is only applied at space-state unit initialization. These values are applied to derive a slew rate limit 236 in the slew rate limit module 234 and the slew rate limit 236 is provided to the budget optimizer 214 of the first stage 202. The slew rate limit 236 may be determined as a time-variant limit that serves to adjust a reference profile for the PDN or the system. The effect of the slew rate limit 236 is to limit changes to the voltage regulator output budget, REGOUT {budget}. Changing the budget slowly over time reduces the slew rate at many points in the power distribution network.

The signals going into the budget optimizer 214 of the first stage 202 and into the budget optimizer 218 of the second stage 204 are targets or references for limits management. In other words, at the card edge, an objective is limiting the card edge current to a not exceeding value as indicated by slew rate limit 236. This card edge current limiting objective can be achieved under the condition that the current drawn at the output of the voltage regulator, for example a PMIC, does not exceed the current value indicated by the REGOUT {budget} of the first stage 202 budget optimizer. The first stage 202 computes the REGOUT {budget} in order to satisfy the slew rate limit 236. Similarly, the second stage 204 budget optimizer 218 computes SOC {budget} in order to meet the first stage 202 budget optimizer 214 output REGOUT {budget}. If the SOC current draw is limited to the not exceeding value of the SOC {budget}, this will cause the current draw at the voltage regulator output to be limited to a not exceeding value of REGOUT {budget}. As a result, the card edge current does not exceed the slew rate limit 236.

When the actions of a limits manager system are limited to throttling a processing core in an SOC, the mechanism described above allows for the accommodation of a large power distribution network latency from the SOC to the card edge. The slew rate limiting module 234, by considering both the card edge current limit 232 and the card edge current measurement y {card edge}, produces a card edge current target that is larger than y {card edge} by a quantity per card edge slew rate control requirement, but also does not exceed the card edge current limit 232. This allows for the control of the slew rate at the card edge, with consideration of a large power distribution network latency, by throttling a processing core in an SOC While a two-stage state-space unit is shown, a single stage state-space unit may be used instead. With a single stage state-space unit, one state-space unit may be associated with the first current sensor and the second current sensor in one embodiment. In another embodiment one state-space unit may be associated with one current sensor. In other words, a two-stage state-space unit may have one or two sensors in each stage. One stage may have one sensor and the other stage have two sensors. For a two-stage state-space unit, as shown, the first state-space unit stage is coupled with the first current sensor and the second current sensor. The second state-space unit stage is coupled with the second current sensor and the third current sensor. Each state-space unit stage is coupled with a pair of current sensors. One sensor for system input for that stage and one sensor for system output for that stage. Each state-space unit stage has an input specifying a current limiting target. By using two sets of current sensors, one set for system inputs, one set for system outputs, the results are more robust and less affected by noise. The state-space unit stages may also be configured as multiple input and multiple output systems. With the advent of inexpensive chiplets upon which the state-space units may be implemented, many different variations may be supported at low cost. Multiple chiplets may be used inside a single package. These may be configured as multiple inputs-single output, multiple input-multiple output, and single input-single output systems.

Figure 3:
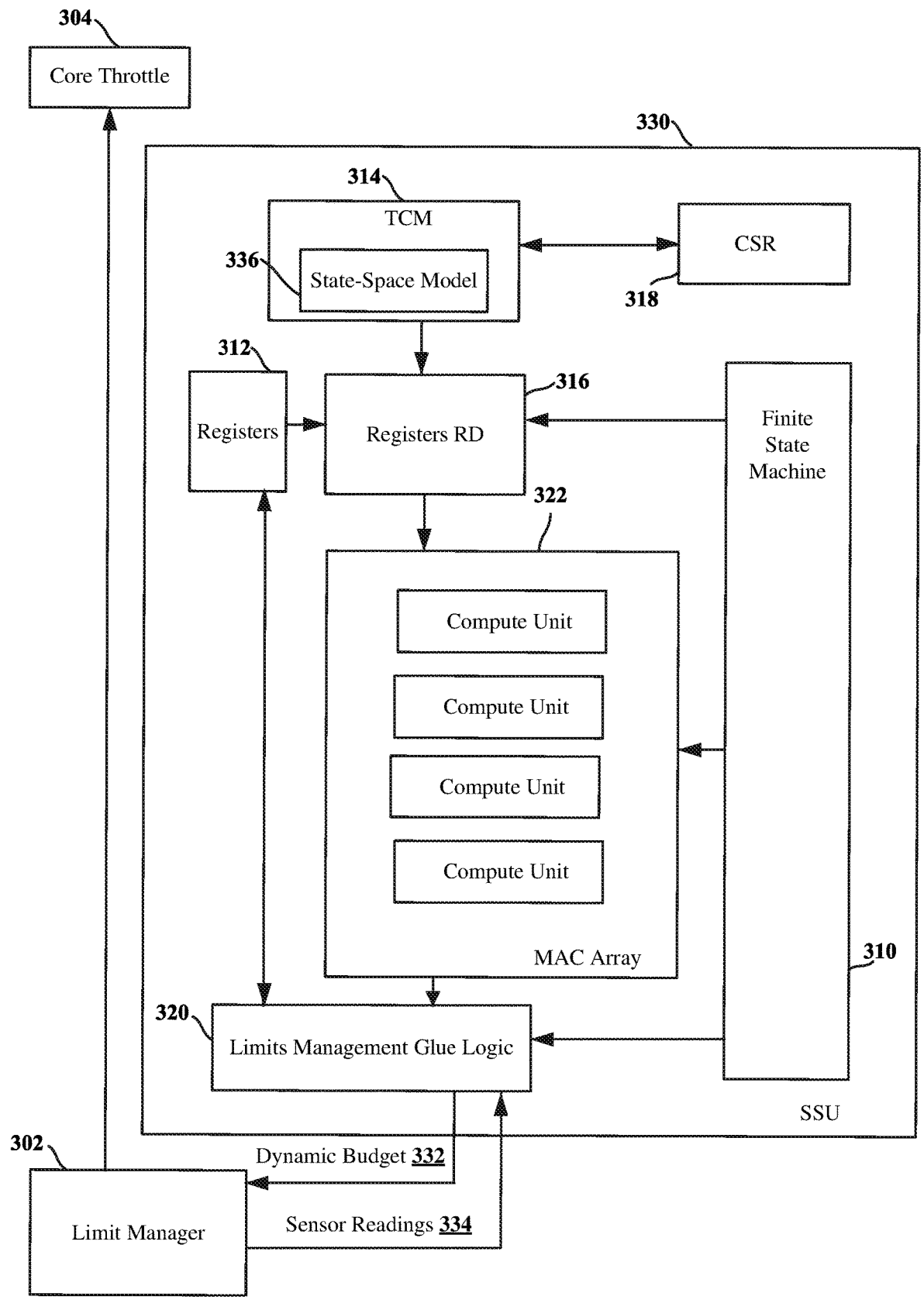
FIG. 3 illustrates a hardware block diagram of an architecture to implement a state-space control model, in accordance with certain aspects of the disclosure.

FIG. 3 is a hardware block diagram of an architecture to implement a state-space control model as shown in FIG. 2. A limit manager 302 receives a dynamic budget 332 from limits management glue logic 320. The limit manager compares a current power consumption of a processing core to the dynamic budget 332 and applies a throttle 304 to the processing core. The dynamic budget 332 is produced in a state-space unit 330. The state-space unit 330 is controlled by a finite state machine 310 that drives the operations in a multiply accumulate (MAC) array 322. The MAC array 322 is shown as having four compute units two for a first stage and two for a second stage of the state-space unit 330. However, there may be more or fewer compute units and more or fewer stages to suit different implementations. The finite state machine controls the sequencing of the operations to fetch data from registers and memory, for example a tightly coupled memory (TCM) 314 and to compute and save results.

Upon initialization, configuration settings are stored in a control status register (CSR) 318 and a state-space model is stored in the TCM 314. The contents of the CSR 318 and the TCM 314 are used by the MAC array 316 during operation. The TCM 314 provides a low latency memory that the MAC array 316 can use to access the model quickly without moving the values as in a cache. The MAC array accesses the model through a set of read registers 316. The sensor readings 334 are provided by the limit manager 302 through limits management glue logic 320 to a set of sensor registers 312. The sensor registers 312 may also be used to store intermediate results. The stored sensor readings 334 in the sensor registers 312 are fed into the MAC array 322 also through the read register 316. The MAC array 320 applies the state-space model from the TCM 314 to the sensor readings in the sensor registers 312 and generates a dynamic budget 332 as an output to the limit manager 320. The finite state machine 310 drives operations in the read registers 316, the MAC array 322 and the limits management glue logic 320 for all of the iterations of the predictions within the state-space unit 330. The limits management glue logic connects the MAC array 322 to the limit manager 302 and the sensor registers 312 providing interfaces that are suitable for each purpose.

Figure 4:
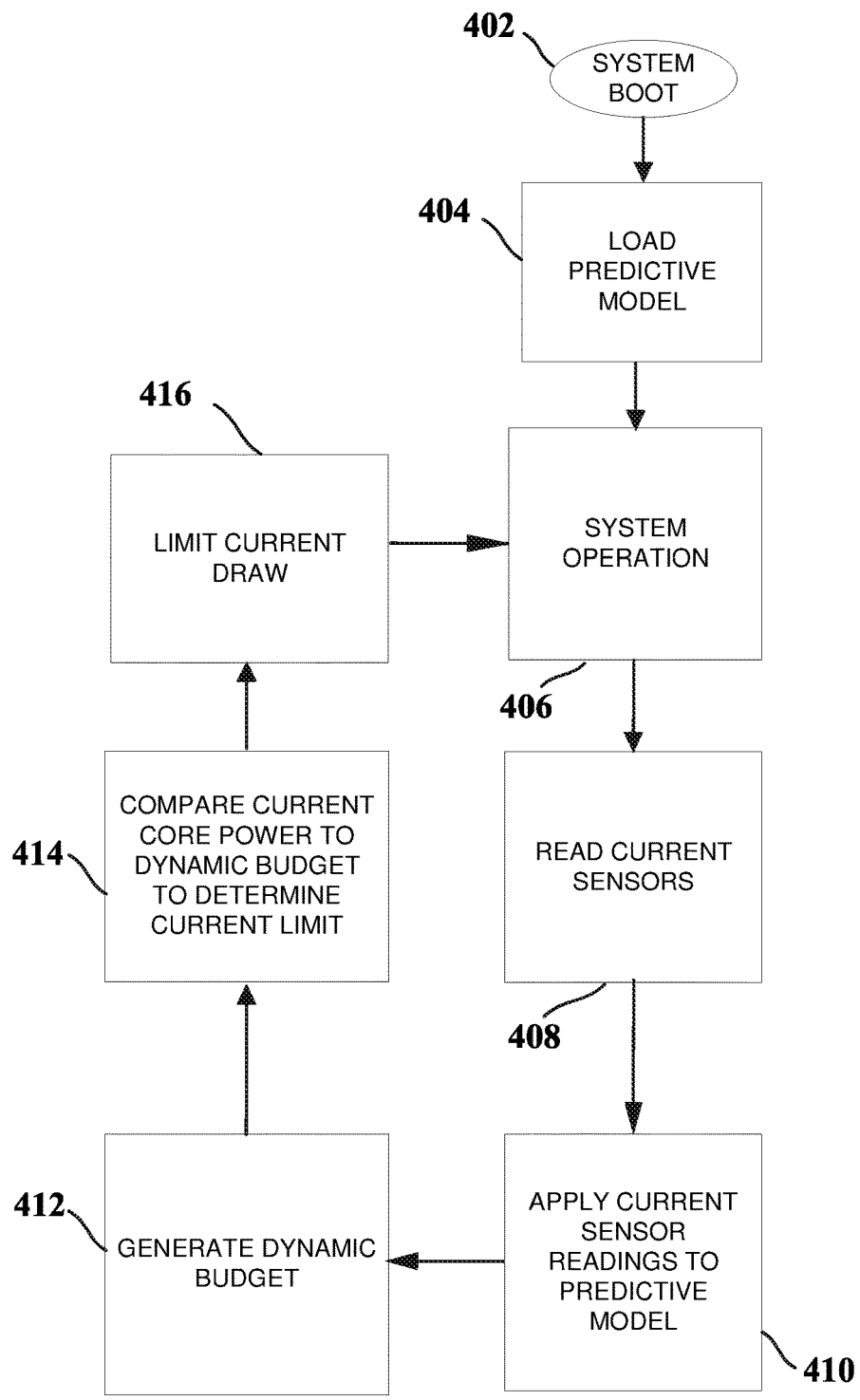
FIG. 4 illustrates a flow diagram of the operation of a limits management system, in accordance with certain aspects of the disclosure.

FIG. 4 is a process flow diagram of the operation of a limits management system, for example, that of FIGS. 2 and 3. The process begins at system boot 402. For an add-on card, this may occur, for example, when the PCIe connector is powered on, which may be at main system boot or at another time. After system boot 402, the predictive model, for example a state-space model is loaded at 404. This may include writing constants into a TCM or into read registers that are easily accessible to the state-space unit. The system operates at 406. This includes processing operations in the processing core, producing current sensor readings, and regulating power.

Reading current sensors is performed at 408 to produce first current sensor readings of the first power rail and additional current sensor readings of any other locations on the power distribution network. The first power rail is coupled to a first processing core of a processor. The sensor readings are received at the space-state unit and a state-space model is executed at 410 by applying the sensor reading to the predictive model that was loaded at 404. At 412, the state-space unit generates a dynamic budget using the predictive model. The budget is therefore also predictive and reflects an optimized estimate of a future power draw by the processing core. At 414, a limit manager compares the current core power to the dynamic budget to determine a current limit. At 416, the current draw of the processing core is limited by the limit manager. In some aspects, the operation of the processing core is throttled in accordance with the comparison. The throttling may be increased or decreased depending on the latest iteration of the dynamic budget from the state-space unit. The throttling may be performed by controlling clock frequencies at the processing core, by inserting wait states or dummy instructions, and in other ways.

Figure 5:
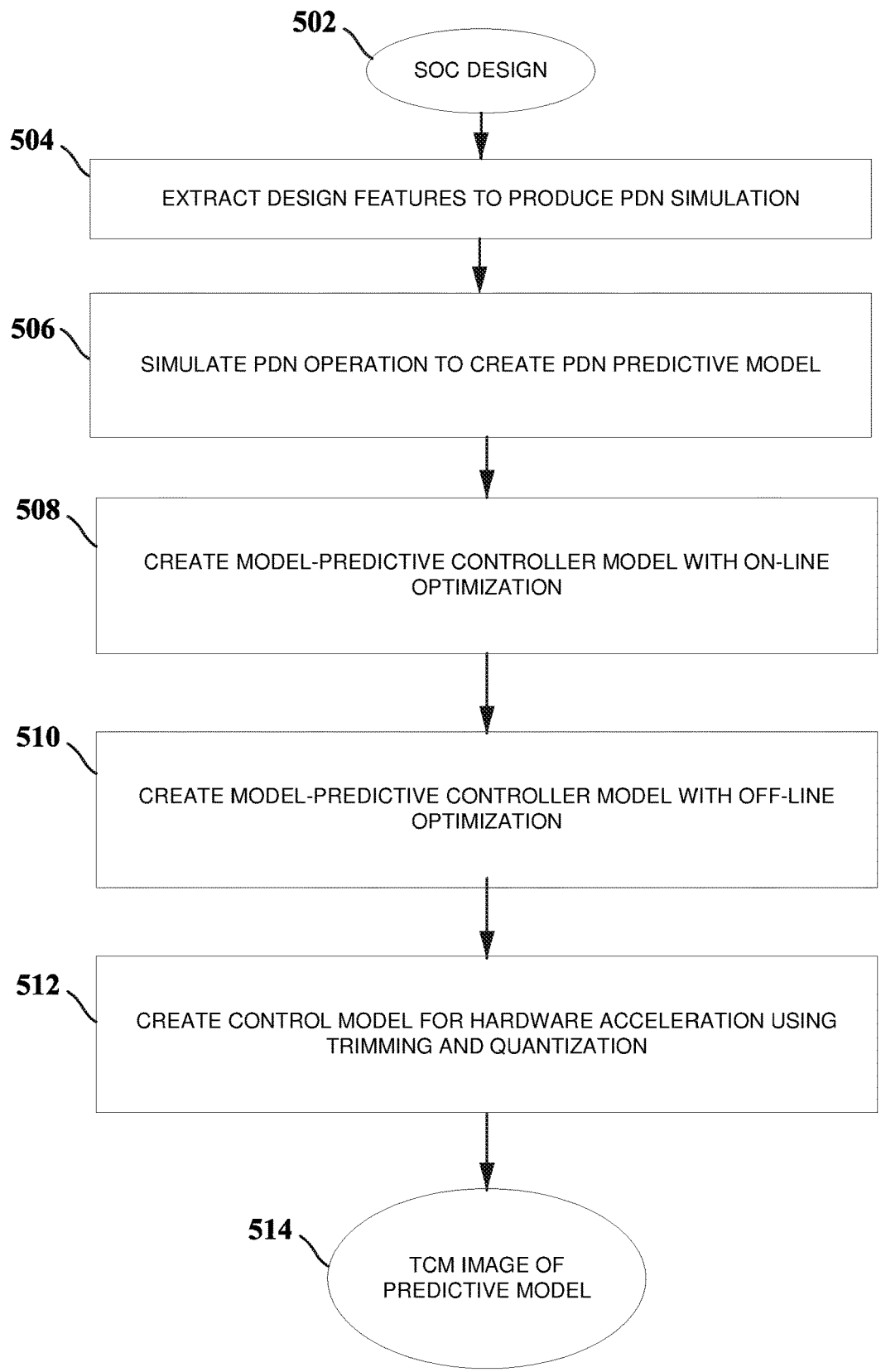
FIG. 5 illustrates a flow diagram of creating a predictive model using a simulation of a design, in accordance with certain aspects of the disclosure.

FIG. 5 is a process flow diagram of creating the predictive model, for example, a state-space model using a simulation of a design, for example an SOC design. The SOC design 502 is provided which includes a PDN and one or more processing cores. At 504, design features are extracted from the design to produce a PDN simulation. The simulation will show how the system responds to changes in current draw from the power source to the SOC current sources, that represent the power consumption of a processing core. The simulation may include inherent and discrete inductance, capacitance and resistance that may cause unwanted oscillation in the current and voltage when there are changes in the power draw. At 506, the operation of the PDN is simulated to create a predictive model of the PDN.

At 508, a model-predictive controller model is created using on-line optimization. Creating a dynamic budget using a design simulation involves running an optimization algorithm in real time during simulated system operation. The on-line optimization records simulated operation of the system to develop values that represent simulated operational conditions. Different simulated stimuli are applied and the response of the simulation is measured. At 510, a model-predictive controller model is created using off-line optimization. The off-line optimization uses the created on-line model-predictive controller model of 508 as an input. It does not run the optimization during system operation in real time, but rather calculates and optimizes in advance a set of optimization solution regions. The regions are defined by a set of pre-computed constants. The off-line optimization estimates the operation of the system based on the simulated operation in order to generate possible predicted future states of the PDN. The pre-computed constants and regions provide for a much simpler computation to derive the dynamic budget during operation than is provided by the on-line model predictive controller model. Coefficients are saved in tables representing the different possible predicted states from both on-line and off-line optimization.

At 512, a control model for hardware acceleration is created using trimming and quantization. The model-predictive controller model is very large and requires significant memory to store all the coefficients and possible states. Through trimming and quantization, the size of the model is significantly reduced. This reduces the processing power required to operate the model and the amount of memory required to store the model. The trimming and quantization operations may be performed iteratively and tested to ensure that the model accurately represents the simulated SOC and PDN. For most implementations, the model is not required to be extremely precise in part because the operation of the PDN is monitored in real time. In operation, corrective action can always be taken as circumstances change. At 514, an image of the predictive model has been generated. This may be stored for use in a TCM or elsewhere.

Figure 6:
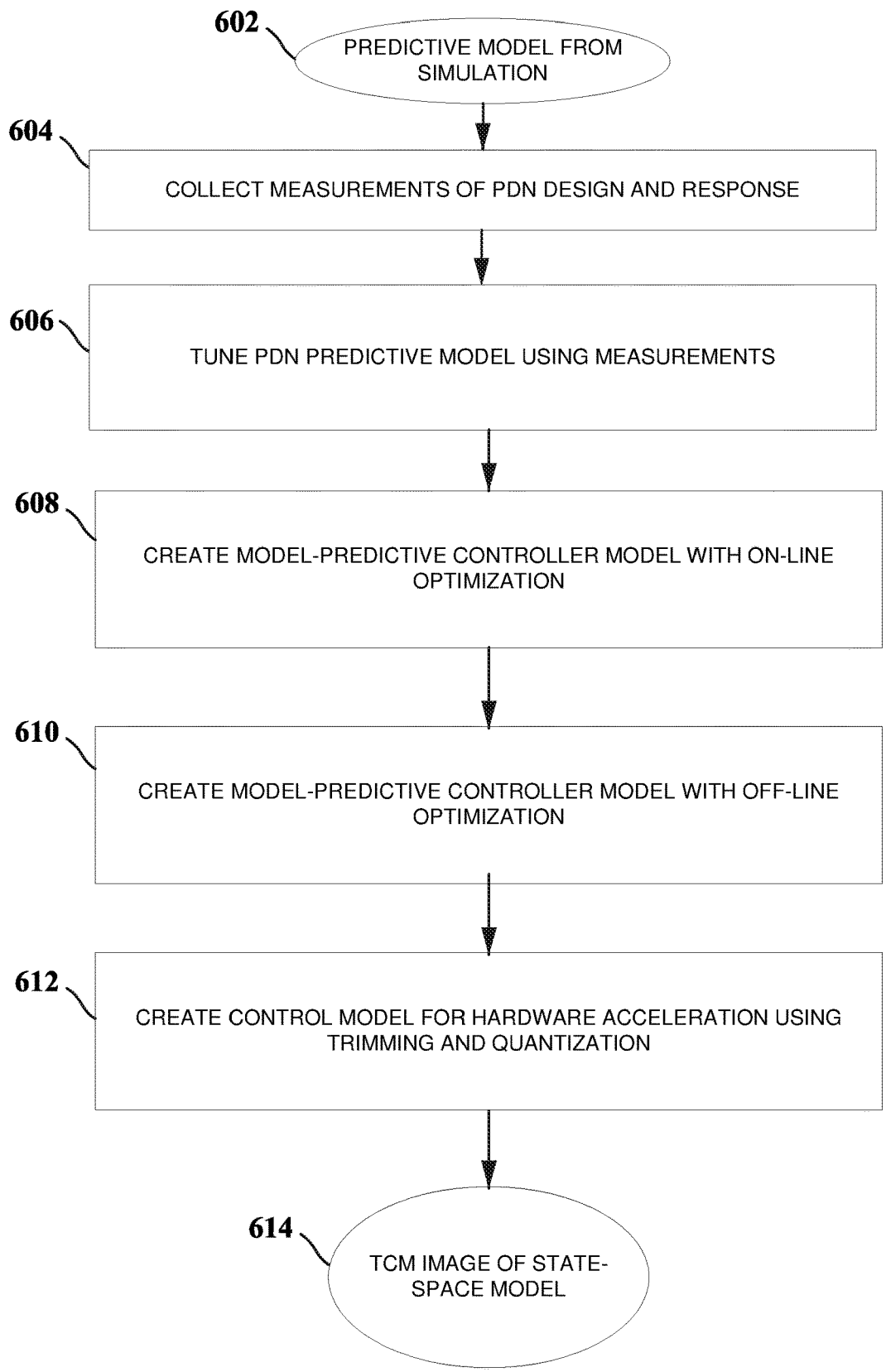
FIG. 6 illustrates a flow diagram of creating or enhancing a predictive model using empirical results, in accordance with certain aspects of the disclosure.

FIG. 6 is a process flow diagram of creating or enhancing a predictive model, for example, a state-space model using empirical results, for example by operating an SOC and PDN. The SOC design has been simulated and analyzed in the process flow of FIG. 5. When an actual device is available, then the simulation-based model may be improved or a model may be created using only the actual device. At 602, a predictive model is optionally provided from simulation. If no predictive model from simulation is available or desired, then the model may be built entirely from empirical data gathered from a physical device. The model is based on a PDN and one or more processing cores. At 604, measurements are collected of the PDN and its response to various stimuli. The measurements are made using the actual device. The measurements show how a real system responds to changes in current draw from the power source to the SOC current sources. The effects of the inherent and discrete inductance, capacitance, and resistance, the PMICs are directly measured in current and voltage under different workload conditions and power draws of the SOC. At 606, the predictive model is tuned using the measurements to improve the predictive model of the PDN.

At 608, a model-predictive controller model is created using on-line optimization. Creating a dynamic budget involves running the optimization in real time during system operation. The on-line optimization records actual operation of the device to develop values that represent measured operational conditions. Different operational stimuli are applied and the response of the device is measured. At 610, a model-predictive controller model is created using off-line optimization. The off-line optimization uses the created on-line model-predictive controller model of 608 as an input. It does not run the optimization during system operation in real time, but rather calculates and optimizes in advance a set of optimization solution regions. The regions are defined by a set of pre-computed constants. The off-line optimization estimates the operation of the system in advance of its actual operation in order to generate possible predicted future states of the PDN. During system operation, the dynamic budget may be determined using less computing resources using the pre-computed constants and the quantization provided by the regions. Coefficients are saved in tables representing the different possible predicted states from both on-line and off-line optimization.

At 612, a control model for hardware acceleration is created using trimming and quantization. The model-predictive controller model is very large and requires significant memory to store all the coefficients and possible states. Through trimming and quantization, the size of the model is significantly reduced. This reduces the processing power required to operate the model and the amount of memory required to store the model. For most implementations, the model is not required to be extremely precise in part because the operation of the PDN is monitored in real time. Corrective action can always be taken as circumstances change. At

614, an image of the predictive model has been generated. This may be stored for use in a TCM as described above with respect to FIG. 3 or elsewhere.

Figure 7:
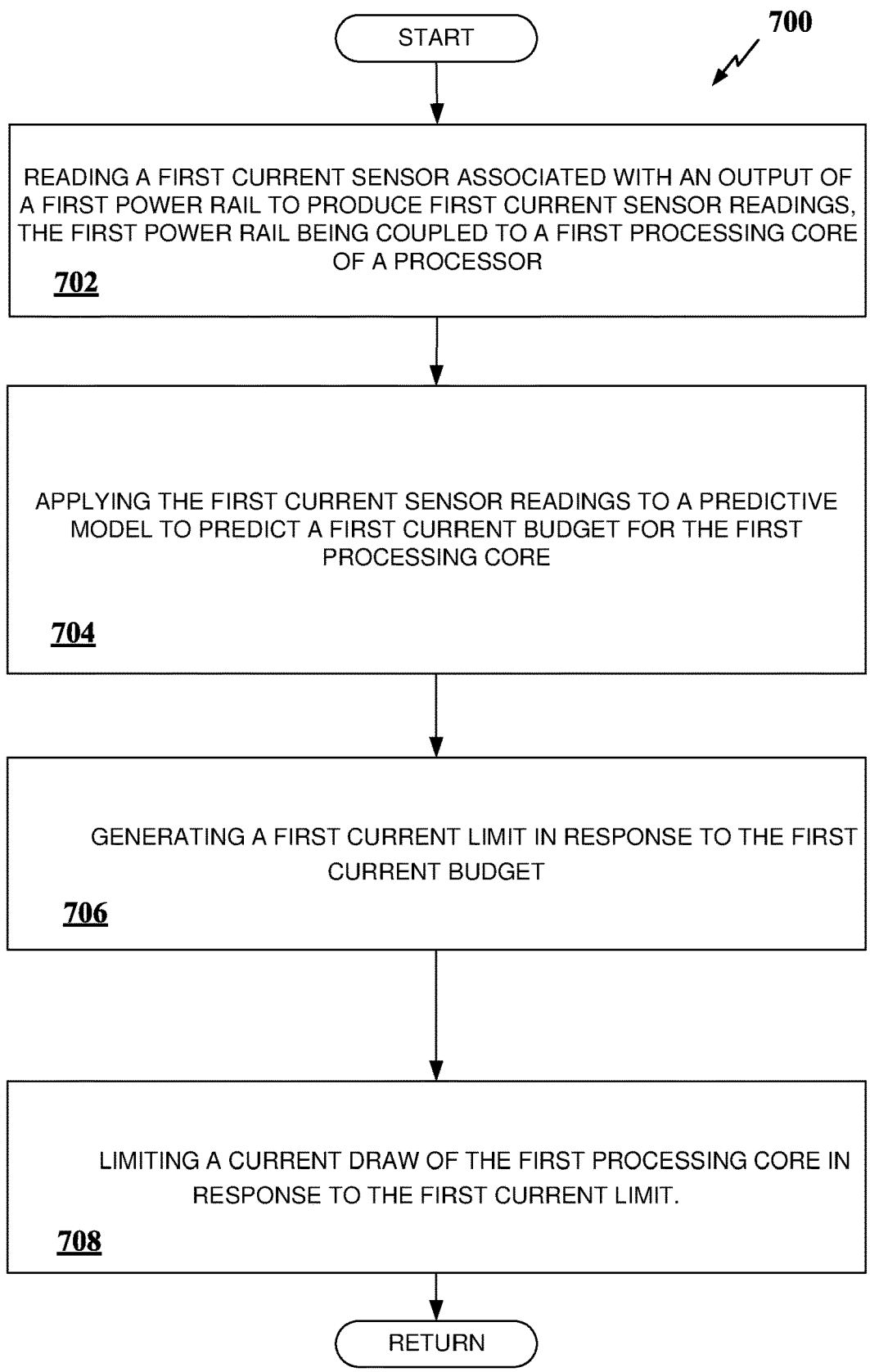
FIG. 7 illustrates a flow diagram of a method implementing limits management for a power distribution network, in accordance with certain aspects of the disclosure.

FIG. 7 is a process flow diagram illustrating an example of a method for applying limits management for a power distribution network. The method may be applied to an add-on card as shown in FIG. 1 or to other devices that operate in different power circumstances. The method may be performed by the hardware configuration of FIG. 3, other circuitry or other components or processing resources than those shown and described herein. The method 700 begins at block 702 with reading a first current sensor associated with an output of a first power rail to produce first current sensor readings, where the first power rail is coupled to a first processing core of a processor. In some aspects, a second current sensor, a third current sensor and additional sensors may be read. In aspects, the first current sensor is associated with the power rail to the first processing core and the second current sensor is associated with a power rail to a second processing core. A third current sensor may be coupled between a common power supply, e.g., a card edge connector, and a PMIC that applies the power to the power rail.

In block 704, applying the first current sensor readings to a predictive model is performed to predict a first current budget for the first processing core. As described, an example of a predictive model is a state-space model. Such a model may compute possible future states and select one of the future states as the predicted future state. The selection uses a quadratic optimization operation that may be processed by multiply accumulate compute units.

In block 706, generating a first current limit in response to the first current budget is performed. In block 708, limiting a current draw of the first processing core in response to the first current limit is performed.

The process of FIG. 7 may be performed for one or more processing cores simultaneously. For a multiple core processor, each of the processing cores may be throttled or have the current draw limited independent of the other processing cores. There may be different current budgets and current limits to suit the operation and power distribution network for different processing cores.

As used herein, "or" is intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a processor, a plurality of processors, one or more processors in conjunction with a DSP core, or any other such configuration.

In one or more exemplary aspects, the functions described may be implemented in hardware, software, firmware, or any combination thereof. If implemented in software, the functions may be stored on or transmitter over as one or more instructions or code stored on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The following provides an overview of examples of the present disclosure.

Example 1: An electronic device comprising: a processor having a first processing core and coupled to a first power rail that is external to the processor; a first current sensor associated with the output of the first power rail and configured to produce first current sensor readings; a state-space unit coupled to the first current sensor and having a memory, the state-space unit comprising a predictive model to apply the first current sensor readings to the predictive model to predict a first current budget for the first processing core; and a limit manager configured to generate a first current limit in response to the first current budget and to limit a current draw of the first processing core in response to the first current limit.

Example 2: The electronic device of example 1, wherein the limit manager is configured to limit the current draw to below the first current limit.

Example 3: The electronic device of example 1 or 2, wherein the limit manager is configured to limit the current draw by controlling a first input clock frequency to the first processing core.

Example 4: The electronic device of any one or more of examples 1-3, wherein the predictive model comprises a state-space model configured to select a predicted future state of the first processing core.

Example 5: The electronic device of example 4, wherein the state-space model is configured to select the predicted future state by computing possible future states using the predictive model and selecting one of the possible future states as the predicted future state.

Example 6: The electronic device of example 5, wherein the state-space model is configured to select one of the possible future states by performing a quadratic optimization operation.

Example 7: The electronic device of example 5 or 6, wherein the possible future states represent a set of regions, each region corresponding to a range of the first current sensor readings.

Example 8: The electronic device of any one or more of examples 1-7, wherein the state-space unit comprises a plurality of multiply-accumulate compute units configured to perform a linear transformation of the first current sensor readings to predict a first current budget.

Example 9: The electronic device of example 8, wherein the multiply-accumulate compute units are coupled to a register of values that represent the predictive model and a finite state machine to load the first current sensor readings and values that represent the predictive model into the multiply-accumulate compute units.

Example 10: The electronic device of any one or more of examples 1-9, further comprising: a first substrate of a system on a chip, the first substrate comprising the processor; and a second substrate separate from the first substrate comprising the first current sensor.

Example 11: The electronic device of any one or more of examples 1-10, wherein the processor further comprises a second processing core and is coupled to a second power rail that is external to the processor, and wherein the electronic device further comprises: a second current sensor associated with the output of the second power rail and configured to produce second sensor readings, wherein the state-space unit is further coupled to the second current sensor to apply the second current sensor readings to the predictive model to predict a second current budget for the second processing core, and wherein the limit manager is further configured to generate a second current limit in response to the second current budget and to limit an additional current draw of the second processing core in response to the second current limit.

Example 12: The electronic device of example 11, wherein the first power rail is coupled to a first power management integrated circuit (PMIC) that controls a first voltage on the first power rail and the second power rail is coupled to a second PMIC that controls a second voltage on the second power rail.

Example 13: The electronic device of example 12 or 13, wherein the first PMIC and the second PMIC are coupled to a common power supply, the electronic device further comprising a third current sensor coupled between the common power supply and the first PMIC and the second PMIC and coupled to the state-space unit, wherein the third current sensor is configured to produce third current sensor readings, and wherein the state-space unit is further configured to apply the third current sensor readings to predict the first current budget.

Example 14: The electronic device of example 14, wherein the common power supply is on a peripheral component interconnect card and is coupled to a peripheral component interconnect card edge power connector.

Example 15: The electronic device of example 12, wherein the first PMIC comprises a voltage regulator coupled between the common power supply and the power rail.

Example 16: The electronic device of example 14 or 15, wherein the limit manager determines a slew rate as a rate of change of current of the third current sensor and wherein the state-space unit is further configured to apply the slew rate to predict the first current budget and the second current budget.

Example 17: The electronic device of example 16, wherein the state-space unit is configured to repeatedly change the first current budget and the second current budget over time and limits an amount of each change to control the slew rate.

Example 18: A method of limits management for a power distribution network comprising: reading a first current sensor associated with an output of a first power rail to produce first current sensor readings, the first power rail being coupled to a first processing core of a processor; applying the first current sensor readings to a predictive model to predict a first current budget for the first processing core; generating a first current limit in response to the first current budget; and limiting a current draw of the first processing core in response to the first current limit.

Example 19: The method of example 18, wherein predicting a first current budget comprises selecting a predicted future state of the first processing core using a state-space model.

Example 20: The method of example 19, wherein selecting the predicted future state comprises performing a quadratic optimization operation.

Example 21: The method of example 19, wherein selecting a predicted future state comprises computing possible future states using the predictive model and selecting one of the possible future states as the predicted future state.

Example 22: The method of any one or more of examples 19-21, wherein the possible future states represent a set of regions, each region corresponding to a range of first current sensor readings.

Example 23: A non-transitory computer-readable medium having instructions stored therein for causing a processor to perform operations for limits management for a power distribution network comprising: reading a first current sensor associated with an output of a first power rail to produce first current sensor readings, the first power rail being coupled to a first processing core of a processor; applying the first current sensor readings to a predictive model to predict a first current budget for the first processing core; and generating a first current limit in response to the first current budget; and limiting a current draw of the first processing core in response to the first current limit.

Example 24: The non-transitory computer-readable medium of example 23, wherein predicting a first current budget comprises performing a linear transformation of the first current sensor readings through a plurality of multiply-accumulate compute units.

Example 25: The non-transitory computer-readable medium of example 23 or 24, the operations further comprising: reading a second current sensor associated with the output of a second power rail being coupled to a second processing core of the processor to produce second current sensor readings; applying the second current sensor readings to the predictive model to predict a second current budget for the second processing core; generating a second current limit in response to the second current budget; and limiting an additional current draw of the second core in response to the second current limit.

Example 26: The non-transitory computer-readable medium of any one or more of examples 23-25, the operations further comprising reading a third current sensor associated with a common power supply to produce third current sensor readings, wherein the common power supply is coupled to a first power management integrated circuit (PMIC) that controls a first voltage on the first power rail and is coupled to a second PMIC that controls a second voltage on the second power rail; and applying the third current sensor readings to the predictive model to predict the first current budget and the second current budget.

Example 27: The non-transitory computer-readable medium of example 26, the operations further comprising: determining a slew rate as a rate of change of current of the third current sensor readings; and applying the slew rate to the predictive model to predict the first current budget and the second current budget.

Example 28: The non-transitory computer-readable medium of example 27, wherein predicting the first current budget and the second current budget comprises repeatedly changing the first current budget and the second current budget over time and limiting an amount of each change to control the slew rate.

What is claimed is:

1. An electronic device comprising:
a processor having a first processing core;
a power distribution network having a first power rail coupled to the first processing core, wherein the first processing core draws current from the first power rail, and wherein the power distribution network has a latency in its response to changes in the current draw;
a first current sensor associated with the output of the first power rail and configured to produce first current sensor readings;
a state-space unit coupled to the first current sensor and having a memory, the state-space unit comprising a predictive model to predict the latency, the state-space unit configured to apply the first current sensor readings to the predictive model to predict a first current budget for the first processing core; and
a limit manager configured to generate a first current limit in response to the first current budget and to limit a current draw of the first processing core in response to the first current limit.

2. The electronic device of claim 1, wherein the limit manager is configured to limit the current draw to below the first current limit.

3. The electronic device of claim 1, wherein the limit manager is configured to limit the current draw by controlling a first input clock frequency to the first processing core.

4. The electronic device of claim 1, wherein the predictive model comprises a state-space model configured to select a predicted future state of the first processing core.

5. The electronic device of claim 4, wherein the state-space model is configured to select the predicted future state by computing possible future states using the predictive model and selecting one of the possible future states as the predicted future state.

6. The electronic device of claim 5, wherein the state-space model is configured to select one of the possible future states by performing a quadratic optimization operation.

7. The electronic device of claim 5, wherein the possible future states represent a set of regions, each region corresponding to a range of the first current sensor readings.

8. The electronic device of claim 1, wherein the state-space unit comprises a plurality of multiply-accumulate compute units configured to perform a linear transformation of the first current sensor readings to predict a first current budget.

9. The electronic device of claim 8, wherein the multiply-accumulate compute units are coupled to a register of values that represent the predictive model and a finite state machine to load the first current sensor readings and values that represent the predictive model into the multiply-accumulate compute units.

10. The electronic device of claim 1, further comprising:
a first substrate of a system on a chip, the first substrate comprising the processor; and
a second substrate separate from the first substrate comprising the first current sensor.

11. The electronic device of claim 1, further comprising:
a second processing core of the processor;
a second power rail of the power distribution network, the second power rail coupled to the second processing core;

a second current sensor associated with the output of the second power rail and configured to produce second sensor readings, wherein the state-space unit is further coupled to the second current sensor to apply the second current sensor readings to the predictive model to predict a second current budget for the second processing core, and wherein the limit manager is further configured to generate a second current limit in response to the second current budget and to limit an additional current draw of the second processing core in response to the second current limit.

12. The electronic device of claim 11, wherein the power distribution network further comprises:
a first power management integrated circuit (PMIC) coupled to the first power rail and configured to control a first voltage on the first power rail; and
a second PMIC coupled to the second power rail and configured to control a second voltage on the second power rail.

13. The electronic device of claim 12, wherein the first PMIC and the second PMIC are coupled to a common power supply, the electronic device further comprising a third current sensor coupled between the common power supply and the first PMIC and the second PMIC and coupled to the state-space unit, wherein the third current sensor is configured to produce third current sensor readings, and wherein the state-space unit is further configured to apply the third current sensor readings to predict the first current budget.

14. The electronic device of claim 13, wherein the common power supply is on a peripheral component interconnect card and is coupled to a peripheral component interconnect card edge power connector.

15. The electronic device of claim 14, wherein the first PMIC comprises a voltage regulator coupled between the common power supply and the power rail.

16. The electronic device of claim 14, wherein the limit manager determines a slew rate as a rate of change of current of the third current sensor and wherein the state-space unit is further configured to apply the slew rate to predict the first current budget and the second current budget.

17. The electronic device of claim 16, wherein the state-space unit is configured to repeatedly change the first current budget and the second current budget over time and to limit an amount of each change to control the slew rate.

18. A method of limits management for a power distribution network, the method comprising:
reading a first current sensor associated with an output of a first power rail to produce first current sensor readings, the first power rail being coupled to a first processing core of a processor, wherein the first processing core draws current from the first power rail, and wherein the power distribution network has a latency in its response to changes in the current draw;
applying the first current sensor readings to a predictive model of a state-space unit to predict the latency, the state-space unit configured to predict a first current budget for the first processing core;
generating a first current limit in response to the first current budget; and
limiting a current draw of the first processing core in response to the first current limit.

19. The method of claim 18, wherein predicting a first current budget comprises selecting a predicted future state of the first processing core using a state-space model.

20. The method of claim 19, wherein selecting a predicted future state comprises computing possible future states using the predictive model and selecting one of the possible future states as the predicted future state.

21. The method of claim 20, wherein the possible future states represent a set of regions, each region corresponding to a range of first current sensor readings.

22. The method of claim 19, wherein selecting the predicted future state comprises performing a quadratic optimization operation.

23. A non-transitory computer-readable medium having instructions stored therein for causing a processor to perform operations for limits management for a power distribution network comprising:
reading a first current sensor associated with an output of a first power rail to produce first current sensor readings, the first power rail being coupled to a first processing core of a processor, wherein the first processing core draws current from the first power rail, and wherein the power distribution network has a latency in its response to changes in the current draw;
applying the first current sensor readings to a predictive model of a state-space unit to predict the latency, the state-space unit configured to predict a first current budget for the first processing core;
generating a first current limit in response to the first current budget; and
limiting a current draw of the first processing core in response to the first current limit.

24. The non-transitory computer-readable medium of claim 23, wherein predicting a first current budget comprises performing a linear transformation of the first current sensor readings through a plurality of multiply-accumulate compute units.

25. The non-transitory computer-readable medium of claim 23, the operations further comprising:
reading a second current sensor associated with the output of a second power rail being coupled to a second processing core of the processor to produce second current sensor readings;
applying the second current sensor readings to the predictive model to predict a second current budget for the second processing core;
generating a second current limit in response to the second current budget; and
limiting an additional current draw of the second processing core in response to the second current limit.

26. The non-transitory computer-readable medium of claim 23, the operations further comprising reading a third current sensor associated with a common power supply to produce third current sensor readings, wherein the common power supply is coupled to a first power management integrated circuit (PMIC) that controls a first voltage on the first power rail and is coupled to a second PMIC that controls a second voltage on the second power rail; and
applying the third current sensor readings to the predictive model to predict the first current budget and the second current budget.

27. The non-transitory computer-readable medium of claim 26, the operations further comprising:
determining a slew rate as a rate of change of current of the third current sensor readings; and
applying the slew rate to the predictive model to predict the first current budget and the second current budget.

28. The non-transitory computer-readable medium of claim 27, wherein predicting the first current budget and the second current budget comprises repeatedly changing the first current budget and the second current budget over time and limiting an amount of each change to control the slew rate.

* * * * *